(12) United States Patent
Tokuda (10) Patent No.: US 8,695,025 B2
(45) Date of Patent: Apr. 8, 2014

(54) MEDIA TRANSPORTATION MECHANISM, METHOD OF CONTROLLING A MEDIA TRANSPORTATION MECHANISM, AND MEDIA PROCESSING DEVICE

(71) Applicant: Seiko Epson Corporation, Tokyo (JP)

(72) Inventor: Takeshi Tokuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/650,423

(22) Filed: Oct. 12, 2012

(65) Prior Publication Data

US 2013/0094336 A1 Apr. 18, 2013

(30) Foreign Application Priority Data

Oct. 13, 2011 (JP) .................................. 2011-225607

(51) Int. Cl.
*G11B 17/04* (2006.01)
(52) U.S. Cl.
USPC .......................................................... 720/615
(58) Field of Classification Search
USPC ............ 369/30.27–30.37; 720/600, 601, 604, 720/605, 615, 616, 626, 645, 652–657, 720/703–717; 347/101, 104, 164, 262, 264; 101/35, 40, 44; 414/225.01–226.02, 414/744.1–744.8, 751.1, 752.1, 753.1, 414/749.6
See application file for complete search history.

(56) References Cited

U.S. PATENT DOCUMENTS

| | | | |
|---|---|---|---|
| 2008/0109117 A1* | 5/2008 | Ichikawa et al. | 700/303 |
| 2008/0250436 A1 | 10/2008 | Kawakami | |
| 2008/0250440 A1* | 10/2008 | Nebashi | 720/704 |
| 2008/0316874 A1* | 12/2008 | Kawakami | 369/30.85 |
| 2008/0320504 A1* | 12/2008 | Oshida | 720/601 |

FOREIGN PATENT DOCUMENTS

JP 2009-026457 A 2/2009

* cited by examiner

*Primary Examiner* — Nathan Danielsen
(74) *Attorney, Agent, or Firm* — Nutter McClennen & Fish LLP; John J. Penny, Jr.; Michael P. Visconti, III (57) ABSTRACT

A media transportation mechanism has: a storage unit that stores disc-shaped media with a center hole in a stack; a transportation arm that moves vertically and has a gripping member to hold a medium stored in the storage unit, and a separating member that moves radially to the medium from the hole of the medium; and a transportation arm drive member that sets the ascent speed of the transportation arm to a first speed, and to a second speed that is slower than the first speed, when moving the transportation arm vertically up while the gripping member holds the medium.

19 Claims, 9 Drawing Sheets

MEDIA TRANSPORTATION MECHANISM, METHOD OF CONTROLLING A MEDIA TRANSPORTATION MECHANISM, AND MEDIA PROCESSING DEVICE

Priority is claimed under 35 U.S.C. §119 to Japanese Application No. 2011-225607 filed on Oct. 13, 2011.

BACKGROUND

1. Technical Field

The present invention relates to a media transportation mechanism that transports CD's (Compact Discs), DVD's (Digital Versatile Discs), BD's (Blu-ray Discs), or other types of disc media, to a method of controlling a media transportation mechanism, and to a media processing device having the media transportation mechanism.

2. Related Art

Media processing devices such as CD/DVD publishers that write data and print labels on optical media to publish CDs and DVDs and other types of optical media are known from the literature. See, for example, Japanese Unexamined Patent Appl. Pub. JP-A-2009-26457. The media processing device described in JP-A-2009-26457 has a blank media stacker that holds a stack of blank unprocessed media to which data has not been burned, a processed media stacker in which processed media are stored in a stack, and a media transportation mechanism that holds and transports the media inside the publisher.

The media transportation mechanism has a transportation arm that can move up and down, and the transportation arm has a guide unit that is inserted into the center hole of the media, and a gripping mechanism that contacts the sides of the center hole and holds the media. The guide unit has a cylindrical base part, and a conical guide surface part that gradually decreases in diameter toward the bottom and is connected to the bottom end of the base part. The gripping mechanism has three fingers that contact the side of the center hole and grip the media. A round shoulder called a stacking ring for protecting the recording surface is formed around the center hole on the recording side of the CD, DVD, or other media.

Unprocessed media are stored in the blank media stacker with the recording surface facing down in the media processing device described in JP-A-2009-26457. As a result, the stacking ring of the top medium rests on the printing surface, which is the opposite side of the medium as the recording side, of the medium therebelow in the stacker, creating adhesion between the discs. When this happens and the transportation arm tries to pick the single disc (top-most medium) at the top of the media stacked in the blank media stacker, the disc immediately below (that is, the second disc from the top) may also be picked up with the top disc. Problems can then result where the discs are then released if the media are transported by the transportation arm with two discs stuck together. The transportation arm in the media processing device taught in JP-A-2009-26457 therefore has a kick lever that moves the disc on the bottom relative to the top disc, and separates the bottom disc from the top disc. The media transportation mechanism can therefore pick and transport only one disc from the top of the blank media stacker.

In addition to CD and DVD media, Blu-ray discs are also increasingly common. Whether or not a stacking ring is provided around the center hole on the recording surface side of Blu-ray discs, the height (thickness) of a Blu-ray disc is less than the height (thickness) of CD and DVD media with a stacking ring. As a result, when Blu-ray discs are stacked in the blank media stacker, the recording side of the top Blu-ray disc and the printing surface of the Blu-ray disc stacked therebelow can easily stick together. If the recording side and printing surface of two Blu-ray discs thus stick together, air cannot easily enter between the recording surface and printing surface, and the adhesion between two Blu-ray discs in the blank media stacker is therefore stronger than the adhesion between CD or DVD media.

Because the transportation arm of the media processing device described in JP-A-2009-26457 has a kick lever as described above, when CD or DVD media are stacked in the blank media stacker and two discs stick together inside the blank media stacker, the disc on the bottom can be separated and dropped from the top disc, and the single top disc can be picked and conveyed from the blank media stacker. However, when the media stacked in the blank media stacker are Blu-ray discs, the adhesion between the Blu-ray discs is greater than the adhesion between CD or DVD media. We discovered that when the media stacked in the blank media stacker are Blu-ray discs and two discs stick together in the blank media stacker, the top disc may be dropped from the transportation arm with the bottom disc as a result of this adhesion when the kick lever separates the bottom disc from the top disc.

Figure 12A:
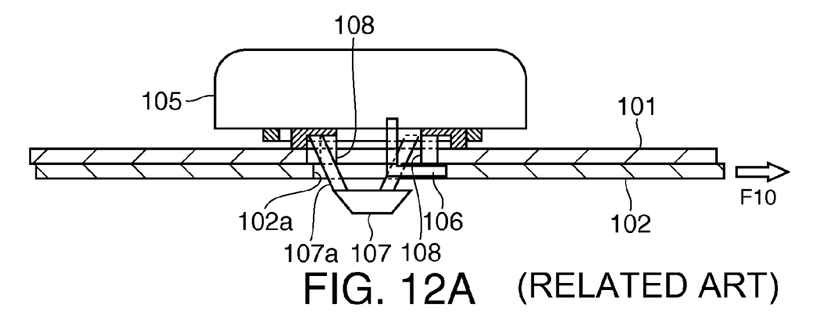
FIGS. 12A-12D describe a problem of the related art.

More specifically, when the fingers 108 try to hold and lift the top disc 101 as shown in FIG. 12A, the next disc 102 therebelow sticks to the top disc 101, the top disc 101 and next disc 102 are lifted together by the transportation arm 105, and the kick lever 106 kicks the next disc 102 to separate the next disc 102 from the top disc 101, force F10 is applied to the next disc 102 in the direction the kick lever 106 kicks, and the next disc 102 moves in the direction kicked by the kick lever 106.

Figure 12B:
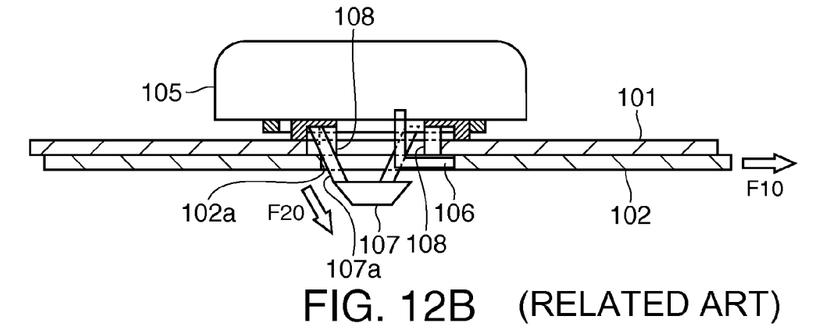
Figure 12C:
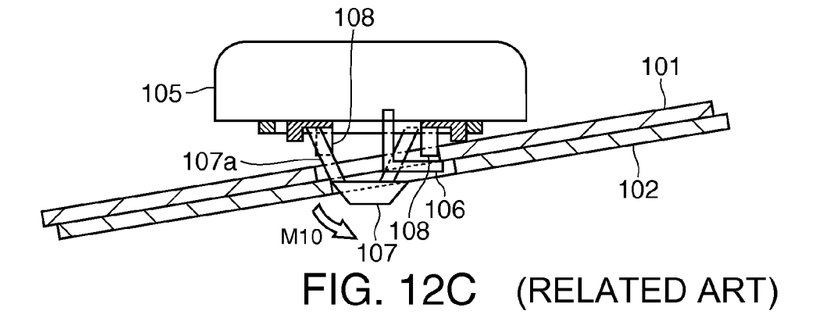

As a result, as shown in FIG. 12B, the side of the center hole 102*a* in the next disc 102 contacts the guide surface 107*a* of the guide unit 107, and force F20 is applied along the guide surface 107*a* to the next disc 102. This produces a moment M10 on the two discs 101 and 102 at the point where the top disc 101 contacts the fingers 108 as shown in FIG. 12C, the top disc 101 separates from the fingers 108, and the two discs 101 and 102 pivot.

Figure 12D:
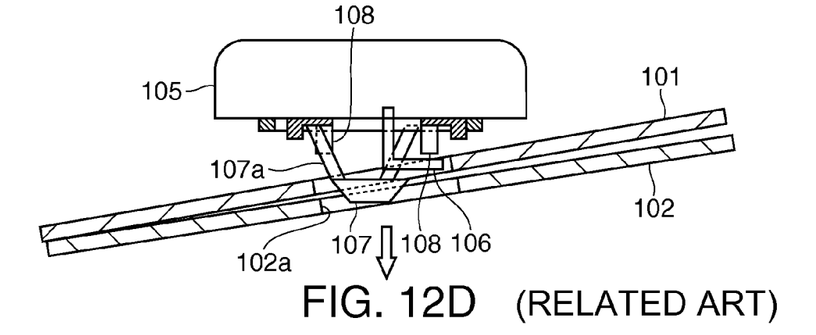

As a result, the top disc 101 drops from the transportation arm 105 with the next disc 102 as shown in FIG. 12D.

In some cases the top disc 101 will separate from the fingers 108, catch on the kick lever 106, and not drop off, but when this happens a problem usually occurs where the top disc 101 is released.

A media transportation mechanism and a method of controlling a media transportation mechanism according to the present invention can reliably transport media one at a time even when the height of the stacking ring disposed to the media is low or a stacking ring is not formed on the media and adhesion between stacked media is strong.

Another object of at least one embodiment of the invention is to provide a media processing device that has this media transportation mechanism or has a media transportation mechanism that is controlled by the method of controlling this media transportation mechanism.

SUMMARY

One aspect of at least one embodiment of the invention is a media transportation mechanism including: a storage unit that stores disc-shaped media with a hole; a transportation arm that moves vertically and has a gripping member to hold a medium stored in the storage unit, and a separating member that moves radially relative to the medium from the hole of the medium; and a transportation arm drive member that sets an ascent speed of the transportation arm to a first speed, and to a second speed that is slower than the first speed, when moving the transportation arm vertically up with the gripping member holding the media.

Preferably, the media transportation mechanism also has a separating member drive member that sets a movement speed of the separating member to a third speed, and to a fourth speed that is slower than the third speed, when moving the separating member radially relative to the medium.

Another aspect of at least one embodiment of the invention is a method of controlling a media transportation mechanism, including steps of: lowering a transportation arm with a gripping member in a storage unit that stores disc-shaped media with a hole; detecting a number of media stored in the storage unit; moving the transportation arm vertically up at a first speed after holding a medium with the gripping member of the transportation arm when the detected number of media stored in the storage unit is three or more; and moving the transportation arm vertically up at a second speed that is slower than the first speed after holding the medium with the gripping member of the transportation arm when the detected number of media stored in the storage unit is two.

Preferably, the control method also has steps of moving a separating member disposed on the transportation arm radially relative to the medium at a third speed after moving the transportation arm at the first speed when the detected number of media stored in the storage unit is three or more; and moving the separating member at a fourth speed that is slower than the third speed after moving the transportation arm at the second speed when the detected number of media stored in the storage unit is two.

The invention can do either or both of changing the ascent speed of the transportation arm from the first speed to a second speed that is slower than the first speed, and changing the speed of moving the separating member from a third speed to a fourth speed that is slower than the third speed, under specific conditions. When the next disc directly below the top disc sticks to the top disc and the next disc is lifted by the transportation arm with the top disc, air can penetrate more easily between the top disc and the next disc due to the effect of the weight of the next disc with the passage of time after the top disc and the next disc are lifted together, and the adhesion between the top disc and the next disc weakens.

Therefore, if the ascent speed of the transportation arm is changed from the first speed to the second speed, or the speed of separating member is changed from the third speed to the fourth speed, when the next disc sticks to the top disc and the next disc is lifted by the transportation arm with the top disc, and under other specific conditions in which the next disc is expected to be lifted by the transportation arm with the top disc, the time from when the transportation arm gripping the top disc starts to ascend until the separating member separates the next disc from the top disc can be increased, and the adhesion between the top disc and the next disc when the discs are separated can be reduced.

Therefore, if the separating operation of the separating member occurs when the transportation arm rises to a specific height, for example, the next disc sticking to the top disc can be dropped before the separating operation, and even if the next disc sticking to the top disc cannot be dropped before the separating operation, the next disc sticking to the top disc can be separated from the top disc and dropped by the separating operation of the separating member. As a result, even if the height of the stacking ring formed on the media is low, or a stacking ring is not formed on the media, and adhesion between stacked media is strong, the next medium can be separated from the top medium while the gripping member continues to hold the top medium when the next medium is picked up by the transportation arm with the top medium. The invention can therefore reliably transport media one at a time even when adhesion between the stacked media is strong.

Further preferably in another aspect of at least one embodiment of the invention, the transportation arm drive member and the separating member drive member cooperate; and when the transportation arm drive member moves the transportation arm at the first speed, the separating member drive member moves the separating member at the third speed.

Because the ascent speed of the transportation arm and the speed of separating member movement are slowed in this aspect of the invention, the time from when the transportation arm starts to rise until the separating member separates the media can be increased when the separating member separates the media after the transportation arm rises to a specific height. The adhesion between the top disc and the next disc therebelow can therefore be reduced when the separating operation occurs, and the next disc can be reliably separated from the top disc when the top disc and the next disc are picked up together by the transportation arm.

A specific condition in this aspect of the invention is that the number of discs stacked in the storage unit that stores the media before being transported is two, for example. If the number of discs in the storage unit is three or more and there is adhesion between the discs, the next disc can be easily separated from the top disc when the transportation arm picks up the top disc because the weight of the third and additional discs below the next (second) disc acts between the top disc and the next (second) disc stacked in the storage unit when the transportation arm picks up the top disc.

When the number of discs in the storage unit is two, the second disc can be easily picked up with the top disc by the transportation arm because only the weight of the next (second) disc is applied between the two discs, that is, the top disc and the next disc, when the transportation arm picks up the top disc. However, because having two discs in the storage unit is the specific condition, and the ascent speed of the transportation arm or the speed of separating member movement is decreased in this case, the next disc can be separated from the top disc when the next (second) disc is picked up by the transportation arm with the top disc.

In a media transportation mechanism according to another aspect of at least one embodiment of the invention, the transportation arm drive member has a stepper motor that produces drive power to move the transportation arm; the media detection unit has a media detector that is disposed on the transportation arm and detects the media when the transportation arm moves to within a specific distance of the media stored in the storage unit, and a computing unit that calculates the number of media stored in the storage unit based on the number of steps the stepper motor has driven when the transportation arm moves to a position where the media detection unit detects the medium; and the media detection unit detects the number of media stored in the storage unit is two based on the result from the computing unit.

The ascent speed of the transportation arm and the speed of separating member movement can be changed automatically based on the output of the media detector and the number of steps driven by the stepper motor.

In this aspect of the invention the specific condition is that the weight of the media picked up by the transportation arm is the weight of two or more discs, for example. When the next (second) disc is picked up with the top disc by the transportation arm in this aspect of the invention, the ascent speed of the transportation arm and the speed of separating member movement are decreased, and the second disc can be separated from the top disc.

A media transportation mechanism according to another aspect of at least one embodiment of the invention preferably also has a transported number detection unit that comprises a load detector that detects the load on the transportation arm drive member when raising the transportation arm with the gripping member of the transportation arm holding the media, and a decision member that determines the number of media held by the gripping member based on an output of the load detector. The decision unit determines the number of media held by the gripping member is two or more when the load detected by the load detector is greater than a predetermined load. The load detector is motor current sensor that measures motor current input. The decision unit is a part of controller. The decision unit calculates a load based on the motor current and the number of media held by the gripping member based on the load.

With this aspect of the invention, the ascent speed of the transportation arm and the speed of separating member movement can be automatically changed based on the motor current.

In another aspect of at least one embodiment of the invention, the media stored in the storage unit includes first media that has a printing side that is printed on and a recording side on which data is recorded by a recording unit, such as a data writer and which has a stacking ring of a first height, and second media that has a printing side that is printed on and a recording side on which data is recorded and which has either a stacking ring that is lower than the first height or no stacking ring; the media are stacked in the storage unit that stores the media with the recording side down; and the specific condition is that the top disc stored in the storage unit is the second media, and the next disc therebelow is the first media.

Even if the number of discs in the storage unit is three or more, when the top disc stored in the storage unit is the second medium, and the next medium therebelow is the first medium, the gap between the first medium, which is the next disc, and the disc therebelow is large, adhesion between the first medium, which is the next disc, and the disc therebelow is therefore weak, and these two media (discs) separate easily.

In this case, therefore, the second media, which is the top disc, and the first media, which is the next disc directly below, can be easily picked up by the transportation arm even if the number of discs in the storage unit is three or more, but if the specific condition is that the top disc stored in the storage unit is the second media and the next disc is the first media, the first media can be separated from the second media when the first media, which is the next disc, is picked up with the second media, which is the top disc, by the transportation arm if the speed that the transportation arm rises and the speed the separating member moves are decreased under this condition.

The specific condition used in the invention could also be that the media transportation mechanism is operating at night, or the media transportation mechanism is operating unmanned. When the media transportation mechanism is operating at night, the possibility that the operator of the media transportation mechanism is not near the media transportation mechanism is high. In addition, when the media transportation mechanism is operating unmanned, the operator is not near media transportation mechanism. In these cases, operation of the media transportation mechanism may therefore stop, or the media transportation mechanism may become damaged, if the next disc cannot be separated from the top disc and the top disc drops with the next disc from the transportation arm. However, by setting nighttime operation of the media transportation mechanism, or unmanned operation of the media transportation mechanism, as the specific condition, the next disc can be separated from the top disc when the top disc and the next disc are picked up together by the transportation arm if the speed the transportation arm rises or the speed the separating member moves is decreased under these conditions, and the foregoing problems can be eliminated.

The media transportation mechanism of the invention, and a media transportation mechanism controlled by the media transportation mechanism control method of the invention, can also be used in a media processing device. Media can be reliably transported one at a time in this media processing device even if the height of the stacking ring formed on the media is low, or a stacking ring is not formed on the media, and the adhesion created between the stacked media is strong.

DESCRIPTION OF EMBODIMENTS

Preferred embodiments of a media transportation mechanism, a method of controlling a media transportation mechanism, and a media processing device according to the present invention are described below with reference to the accompanying figures.

General Configuration of a Media Processing Device

Figure 1:
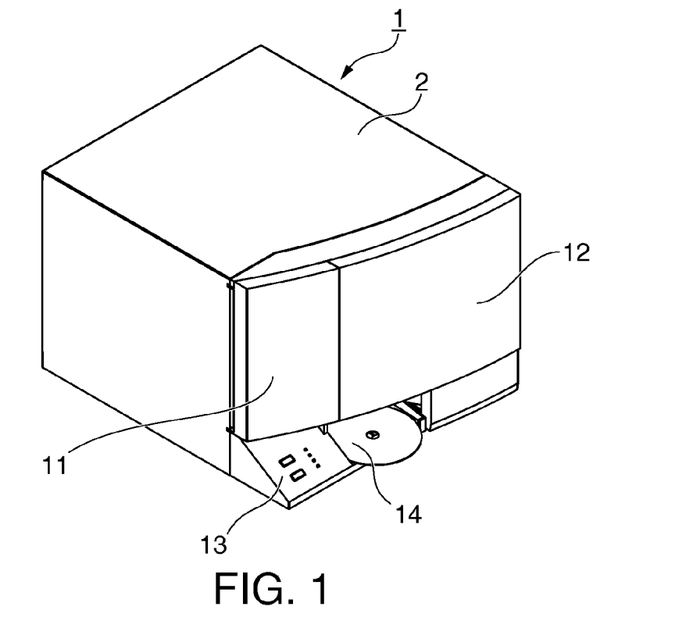
FIG. 1 is an oblique view of a media processing device according to a preferred embodiment of the invention.
Figure 2:
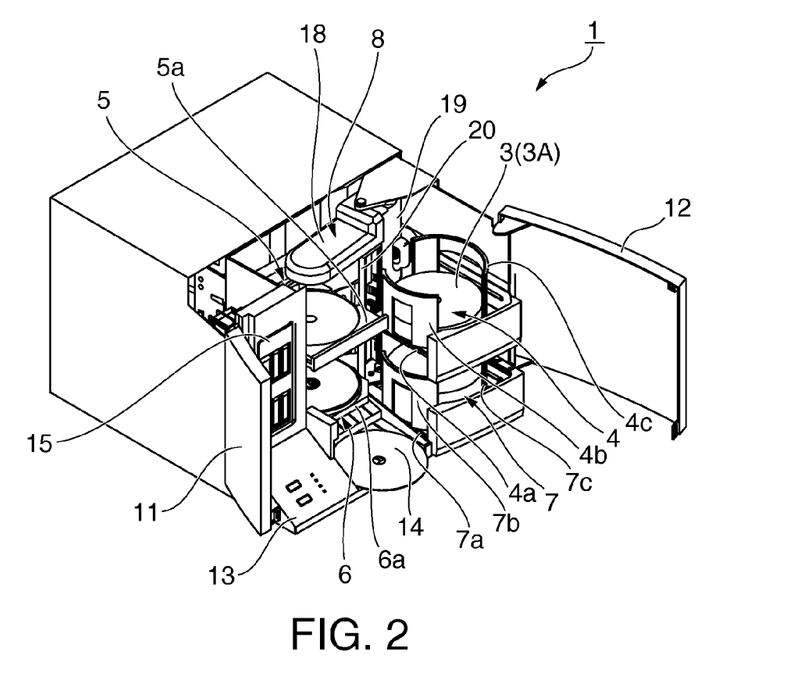
FIG. 2 is an oblique view of the media processing device with the front doors open.
Figure 3:
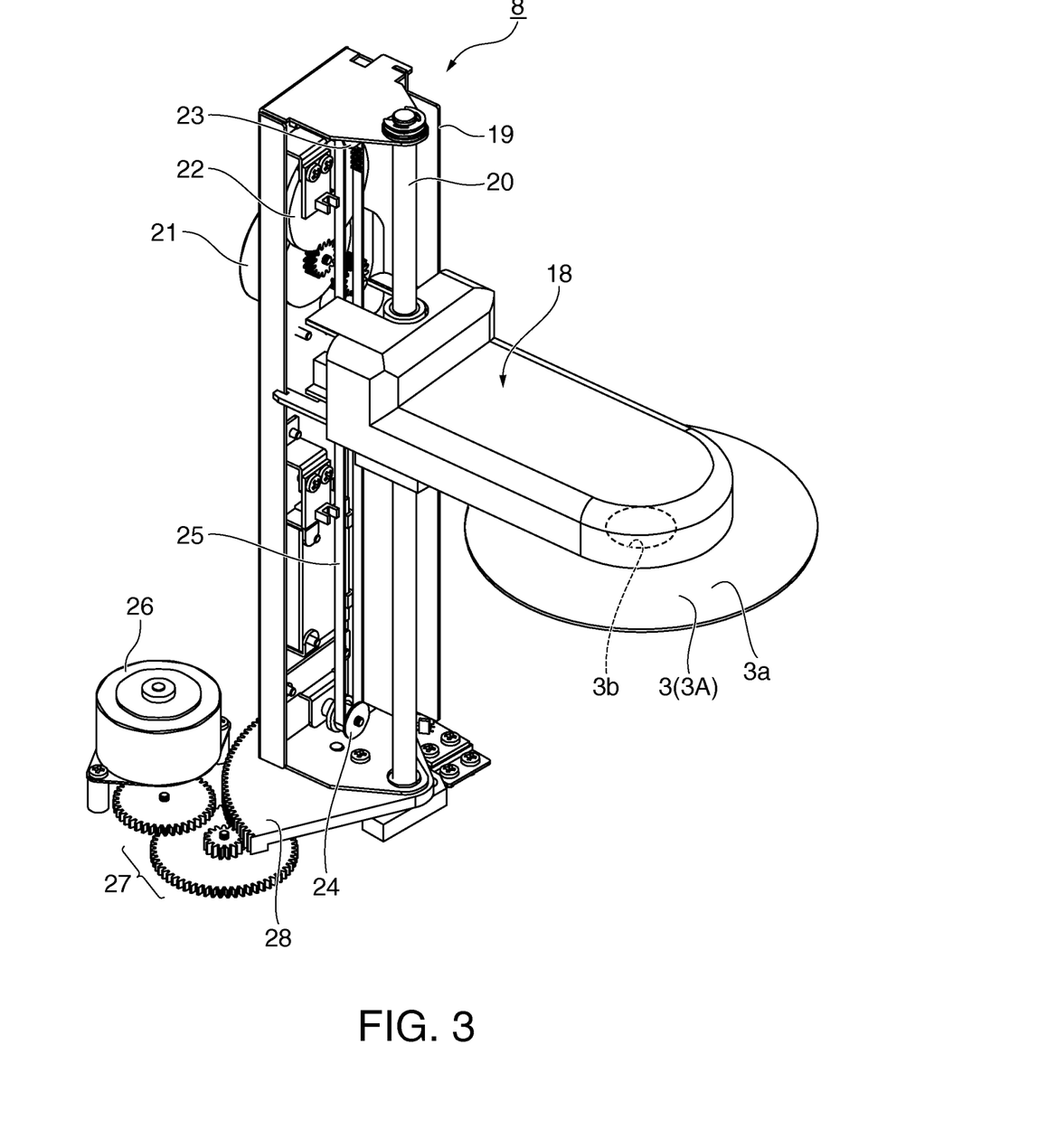
FIG. 3 is an oblique view of the media transportation mechanism.

FIG. 1 is an oblique view of a media processing device 1 according to a preferred embodiment of the invention. FIG. 2 is an oblique view of the media processing device 1 with part of the top of the case 2 removed and the right and left front doors 11, 12 open so that the internal configuration of the media processing device 1 can be easily understood. FIG. 3 is an oblique view of the media transportation mechanism 8.

The media processing device 1 according to the third embodiment of the invention is a disc publisher that writes data and prints a label on disc-shaped media (also "discs" below) 3 such as CD, DVD, and Blu-ray discs, and produces (publishes) finished discs 3. The media processing device 1 includes a media supply stacker (storage unit) 4 that stores unused blank disc media 3 to which data can be written in a stack, a media drive 5 that can write data to discs 3 and read data from discs 3, a label printer 6 that can print a label such as a title indicating the content of the written data on the label side 3a of the disc 3 after data is written, a media discharge stacker 7 that stores discs 3 that have been burned and printed with a label in a stack, and a media transportation mechanism 8 that transports the discs 3 inside the media processing device 1.

The case 2 is basically shaped like a rectangular box. Front doors 11, 12 that open to the left and right are attached to the front of the case 2. An operating panel 13 with groups of display indicators and operating buttons is disposed below one front door 11. A media exit 14 is formed beside the operating panel 13.

Opening the front doors 11, 12 exposes the media supply stacker 4 and media discharge stacker 7, which are disposed coaxially one above the other on the right inside the case 2 of the media processing device 1 as shown in FIG. 2. The media transportation mechanism 8 is disposed behind the media supply stacker 4 and media discharge stacker 7. The media drive 5 is disposed at the top and the label printer 6 is disposed therebelow beside the media supply stacker 4, media discharge stacker 7, and media transportation mechanism 8. In FIG. 2 the media trays 5a, 6a of the media drive 5 and label printer 6 are shown pulled out to the media transfer positions. A cartridge loading unit 15 in which the ink cartridge that supplies ink to the label printer 6 is disposed beside the media drive 5 and label printer 6.

Discs 3 are stored concentrically in a stack with the label side 3a up in the media supply stacker 4. The media supply stacker 4 has a slide tray 4a that can slide horizontally forward, and a pair of left and right curved side walls 4b, 4c that rise vertically above the slide tray 4a. When blank discs 3 that can be burned (i.e. be written on with recording data) are stored in or added to the media supply stacker 4, the user opens the front door 12, pulls the slide tray 4a out, and inserts the discs 3 from above between the side walls 4b, 4c. Once the discs 3 are loaded between the side walls 4b, 4c, the discs 3 are stored in a coaxial stack in the media supply stacker 4, and storing or adding discs 3 is completed once the slide tray 4a is then returned inside the case 2.

Like the media supply stacker 4, the media discharge stacker 7 has a slide tray 7a that can slide horizontally forward, and a pair of left and right curved side walls 7b, 7c that rise vertically above the slide tray 7a. After burning data (writing/recording data on the disc) and/or printing a label is completed, the processed discs 3 are dropped by the media transportation mechanism 8 between the side walls 7b, 7c, and are stored in a coaxial stack in the media discharge stacker 7. The entire stack of discs 3 stored in the media discharge stacker 7 can be removed by opening the front door 12 and pulling the slide tray 7a forward.

The media transportation mechanism 8 transports discs 3 one at a time to processing stations in the case 2, and has a transportation arm 18 that partially covers the label side 3a of a disc 3 in a band extending from the outside circumference to the center, and grips the disc 3 in the center. The transportation arm 18 holds, removes, and carries the top disc 3A, which is the first disc 3 on the top of the stack of discs 3 stored in the media supply stacker 4, for example, to specific positions inside the media processing device 1. The media transportation mechanism 8 also has a chassis 19, and a vertical guide shaft 20 that spans vertically between the top and bottom horizontal support panels of the chassis 19. The transportation arm 18 is attached to the vertical guide shaft 20, and can travel vertically along the vertical guide shaft 20 and pivot horizontally on the vertical guide shaft 20 about an axis of the vertical guide shaft 20.

As shown in FIG. 3, the transportation arm drive unit of the media transportation mechanism 8 includes a motor 21 that moves the transportation arm 18 vertically. The motor 21 is a stepping motor. Motor 21 rotation is transmitted through a gear train 22 to a drive pulley 23 disposed near the top of the chassis 19. A follower pulley 24 is disposed near the bottom of the chassis 19, and a timing belt 25 is mounted on the drive pulley 23 and follower pulley 24. The back end part of the transportation arm 18 is attached to the timing belt 25 on either the left or right side. As a result, driving the motor 21 moves the timing belt 25 vertically and causes the transportation arm 18 attached to the timing belt 25 to move vertically along the vertical guide shaft 20.

The media transportation mechanism 8 also has a motor 26 that rotates the transportation arm 18, and motor 26 rotation is transferred through a gear train 27 to a fan-shaped last gear 28. This fan-shaped last gear 28 can pivot left and right on the vertical guide shaft 20. Parts of the elevator mechanism of the transportation arm 18 are assembled on the chassis 19, which is mounted on the last gear 28. Because driving the motor 26 causes the last gear 28 to pivot left or right, the chassis 19 mounted on the last gear 28 pivots left or right in unison with the last gear 28 on the vertical guide shaft 20. As a result, the transportation arm 18 supported by the elevator mechanism mounted on the chassis 19 also pivots left or right on the vertical guide shaft 20 about the axis of the vertical guide shaft 20.

As shown in FIG. 2, a gap is formed between the pairs of side walls 4b, 4c and side walls 7b, 7c of the media supply stacker 4 and media discharge stacker 7 so that the transportation arm 18 can move vertically therebetween. A space is also provided between the media supply stacker 4 and media discharge stacker 7 so that the transportation arm 18 can pivot horizontally therebetween and move to directly above the media discharge stacker 7.

When the transportation arm 18 pivots horizontally from above the media supply stacker 4, the transportation arm 18 can access the media tray 5a of the media drive 5 at the media transfer position. When the transportation arm 18 descends after the media tray 5a of the media drive 5 is pushed in, the transportation arm 18 can access the media tray 6a of the label printer 6 at the media transfer position. When the transportation arm 18 descends after the top and bottom media trays 5a, 6a are pushed into the media drive 5 and label printer 6, the transportation arm 18 can access the media exit 14. Discs 3 can thus be transported to various locations by moving the transportation arm 18 up, down, left, and right in different combinations.

Configuration of the Transportation Arm

Figure 4:
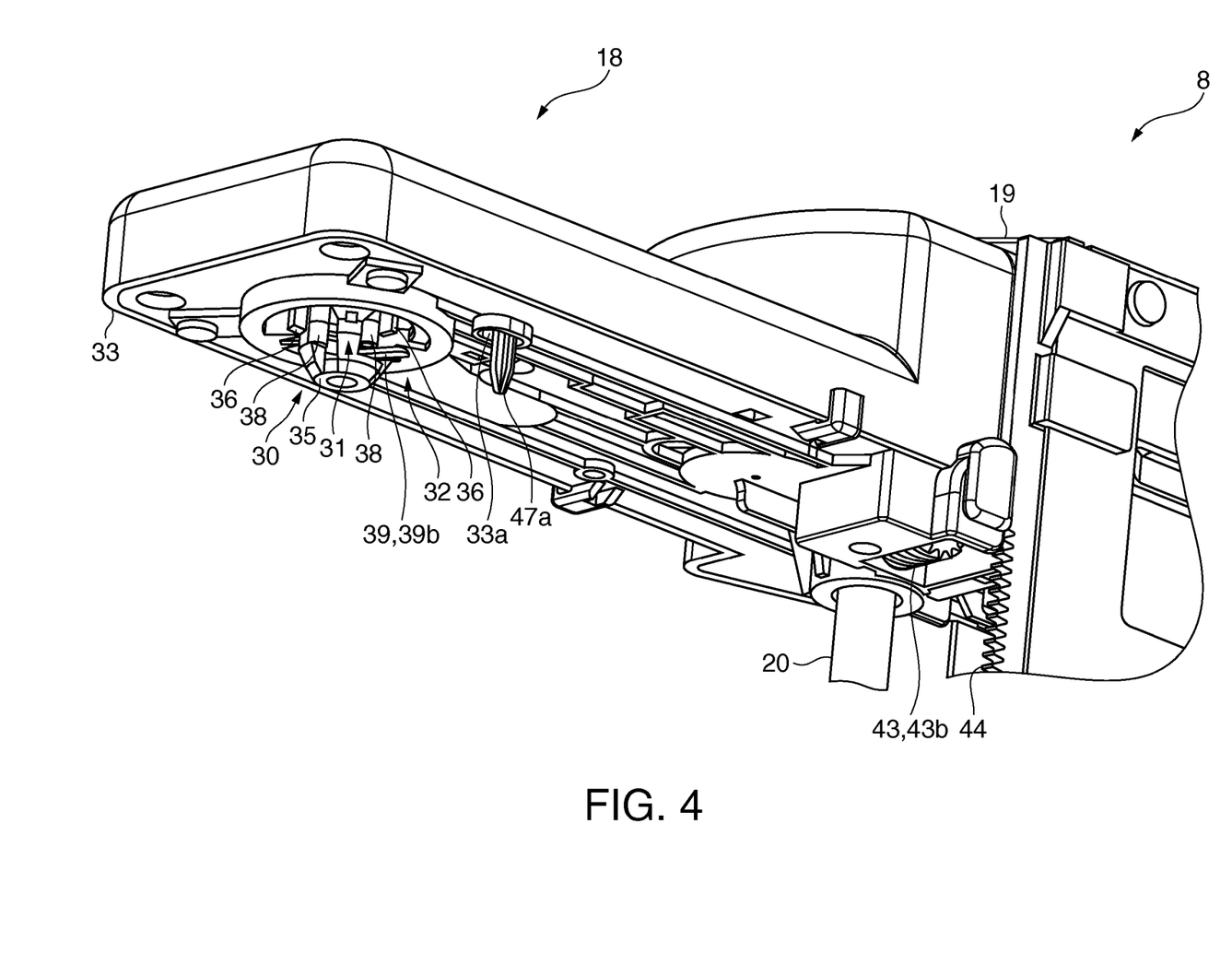
FIG. 4 is an oblique view of the transportation arm from below.
Figure 5:
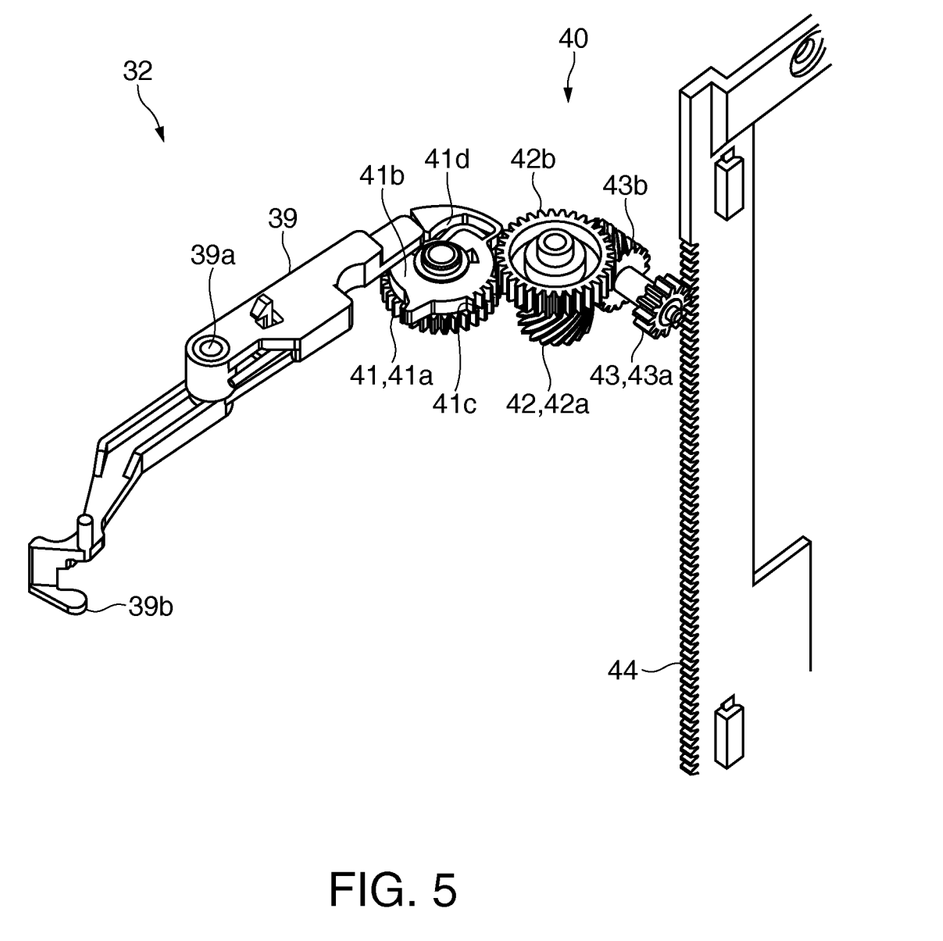
FIG. 5 is an oblique view of the separating mechanism from above.
Figure 6A:
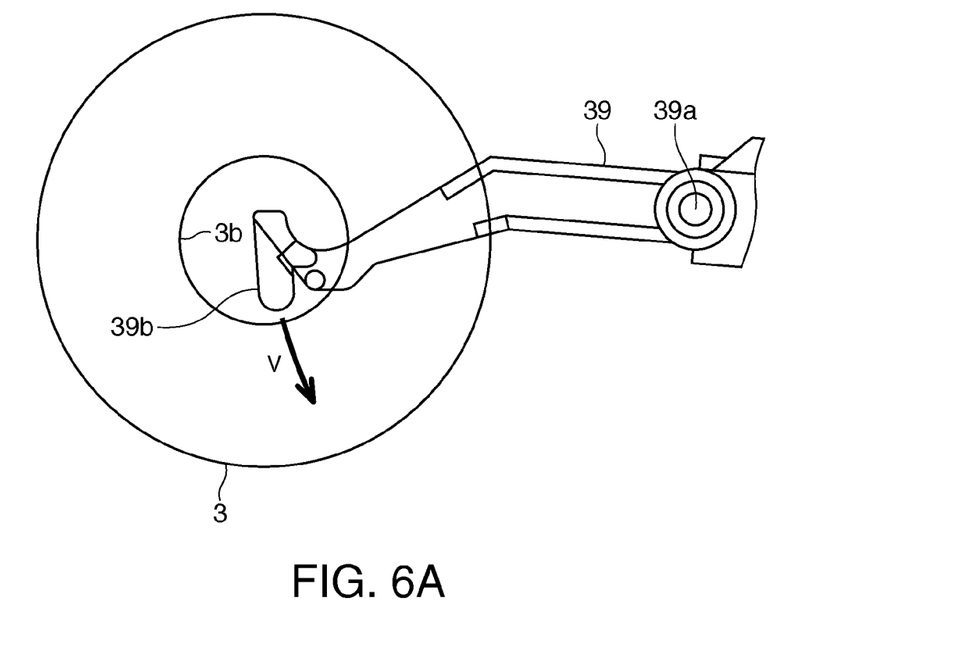
FIGS. 6A and 6B describe the operation of the kick lever.
Figure 6B:
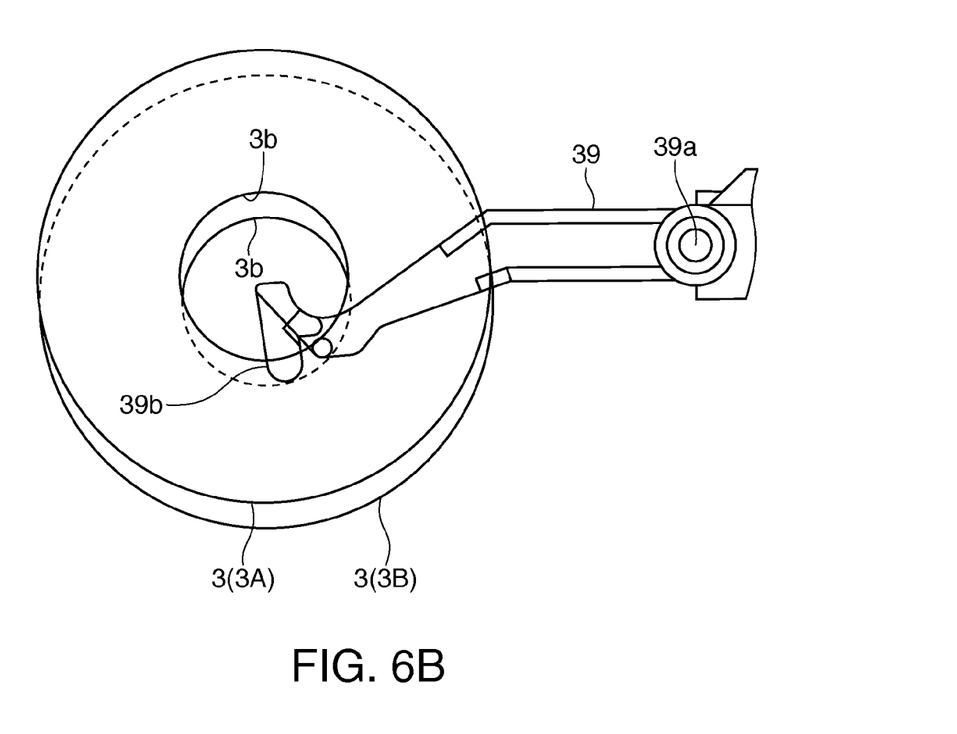
Figure 7:
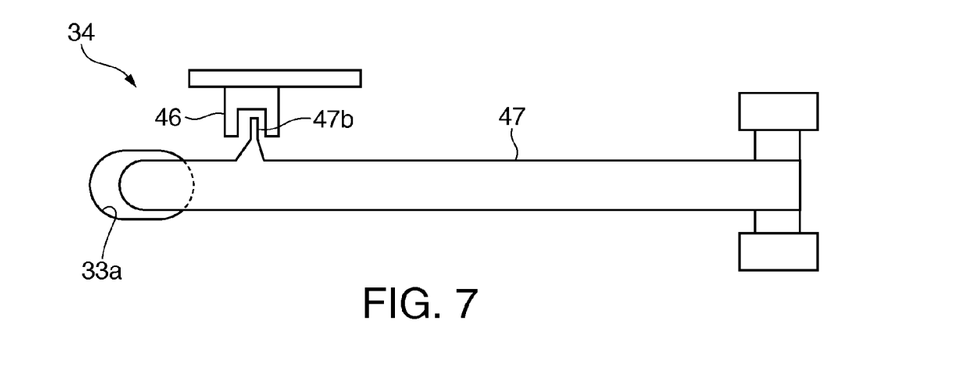
FIG. 7 is a plan view of the media detection mechanism.
Figure 8A:
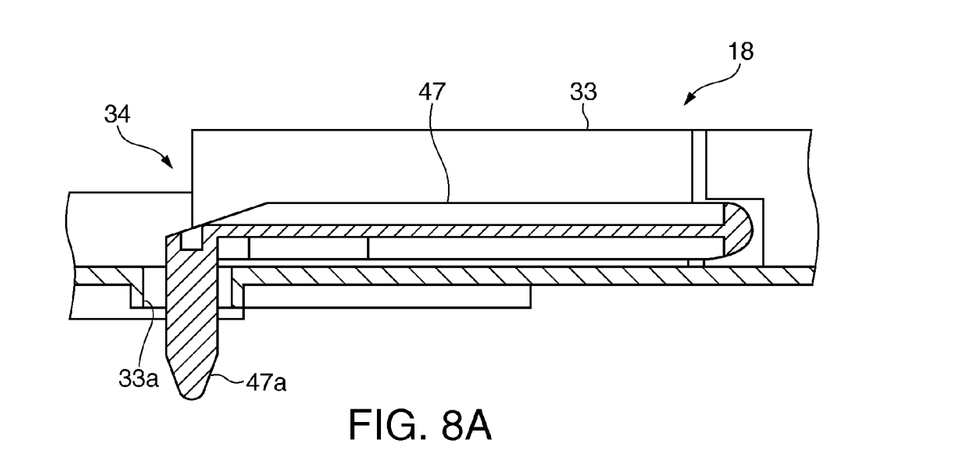
FIGS. 8A and 8B are section views of the media detection mechanism.
Figure 8B:
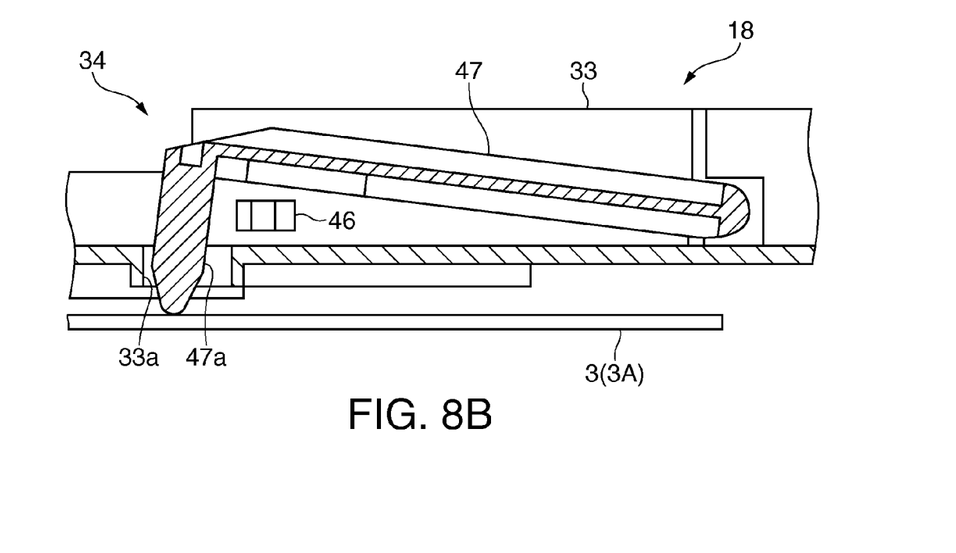
Figure 9:
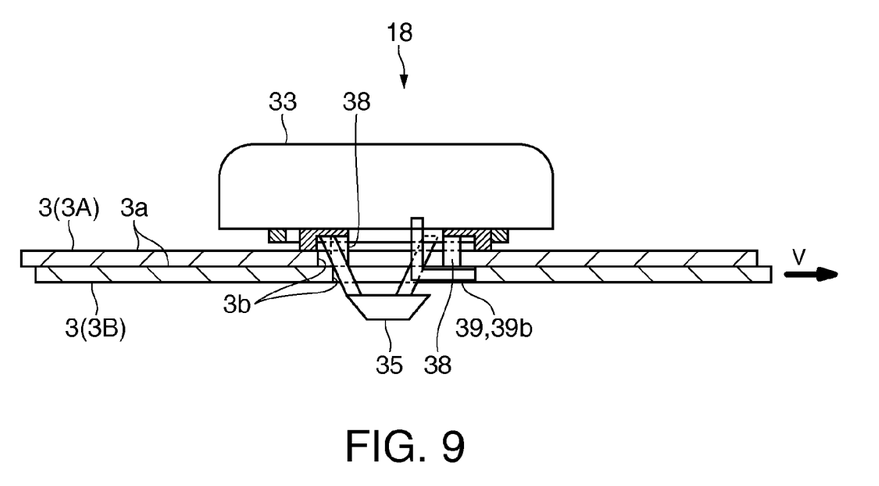
FIG. 9 shows the top disc and the next disc therebelow being lifted together by the transportation arm.
Figure 10:
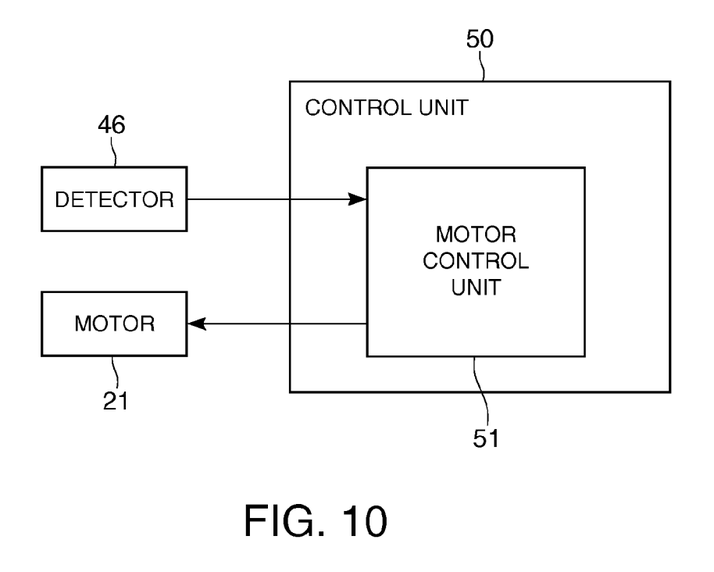
FIG. 10 is a block diagram of the configuration of the control unit related to controlling media transportation, and peripheral devices.

FIG. 4 is an oblique view of the transportation arm 18 from below. FIG. 5 is an oblique view of a separating mechanism 32 from above. FIG. 6 describes operation of a kick lever 39. FIG. 7 is a plan view of a media detection mechanism 34. FIG. 8A and FIG. 8B are section views of the media detection mechanism 34, FIG. 8A showing when a disc 3 is not detected, and FIG. 8B showing when a disc 3 is detected. FIG. 9 shows when the top disc 3A and the next disc 3B immediately therebelow are picked up together by the transportation arm 18. FIG. 10 is a block diagram of the configuration and peripheral devices related to disc 3 transportation control by the control unit 50 of the media transportation mechanism 8. Control unit is a controller. The control unit 50 has a motor control unit 51 that controls the motor 21. The motor control unit 51 is a motor driver circuit disposed in the controller or motor driver software executed in the controller. The detector 46 is connected to the motor control unit 51. The detector 46 detects the medium in the media supply stacker 4. The motor control unit 46 controls rotation of the motor 21 based on a result of the detector 46.

A media guide 30 that is inserted to the center hole 3b of the disc 3, and a gripping mechanism 31 that holds the disc 3, are disposed on the transportation arm 18. As described above, the transportation arm 18 picks up and transports the top disc 3A, which is the first disc 3 on the top of the stack of discs 3 stored in the media supply stacker 4, to specific positions inside the media processing device 1. The transportation arm 18 therefore also has a separating mechanism 32 that separates the next disc 3B (see FIG. 9) from the top disc 3A when the next disc 3 below the top disc 3A sticks to and is picked up with the top disc 3A.

A media detection mechanism 34 that detects when the distance between the end of the transportation arm 18 and the top disc 3A stored in the media supply stacker 4 approaches a specific distance is also disposed on the transportation arm 18. The gripping mechanism 31, separating mechanism 32, and part of the media detection mechanism 34 are housed inside a flat, basically rectangular case 33.

The media guide 30 is disposed on the distal end part of the transportation arm 18. The media guide 30 is on the bottom side of the transportation arm 18. The center part of the media guide 30 is a guide unit 35 for centering the transportation arm 18 on the disc 3. The guide unit 35 is conically shaped with the outside diameter decreasing towards the bottom end. Three pins 36 are disposed at an equiangular pitch on the same circle around the outside of the guide unit 35. The diameter of the circumcircle of the three pins 36 is slightly smaller than the inside diameter of the disc 3 center hole 3b. When a disc 3 is gripped by the gripping mechanism 31, the guide unit 35 guides the center hole 3b of the disc 3 to the outside of the three pins 36.

The gripping mechanism 31 has three columnar fingers (gripping members) 38 that contact the sides of the center hole 3b of the disc 3 and grip the disc 3. The three fingers 38 are disposed inside notches formed in the guide unit 35 at an equiangular pitch around the same circle. The three fingers 38 are connected to a drive mechanism that uses a solenoid or other drive source to move the fingers 38 together in the radial direction. When the three fingers 38 move radially to the outside when the center hole 3b of the disc 3 is positioned around the outside of the pins 36, the fingers 38 contact the side of the disc 3 center hole 3b, and the disc 3 is thus gripped by the fingers 38. When the fingers 38 are holding the disc 3 and the fingers 38 then move radially to the inside, the disc 3 is released by the fingers 38. As shown in FIG. 9, the fingers 38 are formed (in particular in length) and positioned so that when the disc 3 is gripped, the fingers 38 contact the side of the center hole 3b in the top disc 3A to which the next disc 3B is clinging, but do not contact the side of the center hole 3b in the next disc 3B.

The separating mechanism 32 has a kick lever (separating member) 39 that is supported with the middle part 39a pivotable relative to the case 33. An operator 39b (separating member) is formed on the distal end side of the kick lever 39, which bends down and to the side. The operator 39b is disposed inside a cutout formed in the guide unit 35. A rocking mechanism 40 (separating member drive member) is disposed on the base end of the kick lever 39.

As shown in FIG. 5, the rocking mechanism 40 includes a compound clutch gear 41, a vertical compound transfer gear 42, a horizontal compound transfer gear 43, and a rack 44. The compound clutch gear 41 and vertical compound transfer gear 42 are supported by the case 33 so that they can rotate on a vertical axis of rotation. The horizontal compound transfer gear 43 is supported by the case 33 rotatably on a horizontal axis of rotation. The rack 44 is supported by the chassis 19 parallel to the vertical guide shaft 20.

The pinion 43a of the horizontal compound transfer gear 43 meshes with the rack 44. A helical gear 43b is disposed on the horizontal compound transfer gear 43. The helical gear 43b meshes with the helical gear 42a of the vertical compound transfer gear 42. A spur gear 42b is disposed to the vertical compound transfer gear 42. The spur gear 42b meshes with the spur gear 41a of the compound clutch gear 41. An intermittent gear 41b that rotates relative to the spur gear 41a is also disposed to the compound clutch gear 41. The intermittent gear 41b has a tooth train 41c of plural teeth on part of the outside surface. This tooth train 41c can mesh with the spur gear 42b of the vertical compound transfer gear 42. A cam hole 41d is formed in the top of the intermittent gear 41b. A cam pin (not shown in the figure) that protrudes down near the base of the kick lever 39 is disposed slidably in the cam hole 41d. A clutch mechanism is disposed between the spur gear 41a and intermittent gear 41b, the spur gear 41a and intermittent gear 41b rotate together in a specific range within the range of rotation of the compound clutch gear 41, and outside this range the intermittent gear 41b rotates freely relative to the spur gear 41a.

Before the top disc 3A in the media supply stacker 4 is picked up by the transportation arm 18, the operator 39b of the kick lever 39 moves to the inside in the radial direction from the side of the center hole 3b of the disc 3 as shown in FIG. 6A. When the transportation arm 18 then starts to rise, the spur gear 41a and intermittent gear 41b of the compound clutch gear 41 start to rotate. When the intermittent gear 41b rotates with the spur gear 41a, the kick lever 39 rotates on the middle part 39a, and the operator 39b moves in the direction of arrow V.

When the transportation arm 18 rises a specific amount and the intermittent gear 41b rotates a specific amount, the distal end part of the operator 39b moves radially to the outside from the side of the center hole 3b of the disc 3 held by the fingers 38 as shown in FIG. 6B. When the transportation arm 18 then descends, the intermittent gear 41b rotates with the spur gear 41a. When the transportation arm 18 descends a specific amount and the intermittent gear 41b rotates a specific amount, the kick lever 39 pivots on the middle part 39a, and the distal end of the operator 39b moves radially to the inside from the side of the center hole 3b of the disc 3 as shown in FIG. 6A.

The kick lever 39 thus pivots on the middle part 39a and the operator 39b of the kick lever 39 moves radially to the disc 3 in conjunction with the transportation arm 18 ascending. After the distal end of the operator 39b moves a specific amount to the outside radially to the disc 3 when the transportation arm 18 rises, the intermittent gear 41b rotates freely with the spur gear 41a, and transfer of power to the kick lever 39 is interrupted.

After the distal end of the operator 39b moves a specific amount radially to the inside of the disc 3 when the transportation arm 18 descends, the intermittent gear 41b rotates freely with the spur gear 41a, and transfer of power to the kick lever 39 is again interrupted.

The operator 39b is disposed so that it does not contact the side of the center hole 3b in the top disc 3A, but contacts the side of the center hole 3b in the next disc 3B that is stuck to the bottom of the top disc 3A as shown in FIG. 9. As a result, when the transportation arm 18 rises and the operator 39b moves in the direction of arrow V when the next disc 3B is stuck to the bottom of the top disc 3A held by the fingers 38, the operator 39b contacts the side of the center hole 3b in the next disc 3B and moves next disc 3B in the direction of arrow V relative to the top disc 3A as shown in FIG. 6B. When the next disc 3B moves in the direction of arrow, the next disc 3B stuck to the top disc 3A separates from the top disc 3A and drops.

As shown in FIG. 7 and FIGS. 8A and 8B, the media detection mechanism 34 has a detector (media detector) 46, and a detection lever 47. The detector 46 is, for example, an optical sensor including a light-emitting device and a photo-detection device disposed in opposition with a specific gap therebetween. The base end of the detection lever 47 is supported by the case 33 so that the detection lever 47 can rotate on a horizontal axis of rotation. The distal end part 47a of the detection lever 47 bends down, and as shown in FIG. 4 protrudes below the bottom of the case 33 from an opening 33a formed in the bottom of the case 33. An interrupter 47b that enters the gap between the light-emitting device and photo-detection device of the detector 46 is formed on the side of the detection lever 47 as shown in FIG. 7.

When a disc 3 is not within a specific range of the bottom of the transportation arm 18, the distal end part 47a of the detection lever 47 of the media detection mechanism 34 protrudes greatly below the case 33 as shown in FIG. 8A. At this time the interrupter 47b is in the gap between the light-emitting device and photodetection device of the detector 46. When the transportation arm 18 descends and the distal end of the distal end part 47a of the detection lever 47 contacts the top disc 3A in the media supply stacker 4, the detection lever 47 pivots on the base end and the interrupter 47b leaves the gap between the light-emitting device and photodetection device of the detector 46 as shown in FIG. 8B. That the distal end of the transportation arm 18 has come within a specific distance of the top disc 3A in the media supply stacker 4 can thus be detected from the interrupter 47b leaving the gap between the light-emitting device and photodetection device of the detector 46. Furthermore, because the interrupter 47b is outside the gap between the light-emitting device and photodetection device of the detector 46 while the top disc 3A is held by the transportation arm 18, that the top disc 3A is held by the transportation arm 18 can also be detected by the media detection mechanism 34.

As shown in FIG. 10, the control unit 50 of the media transportation mechanism 8 has a motor control unit 51 that controls the motor 21, and the detector 46 is connected to the motor control unit 51. The detector 46 detects the medium in the media supply stacker 4. The motor control unit 51 controls rotation of the motor 21 based on a result of the detector 46.

Controlling the Media Transportation Mechanism

Figure 11A:
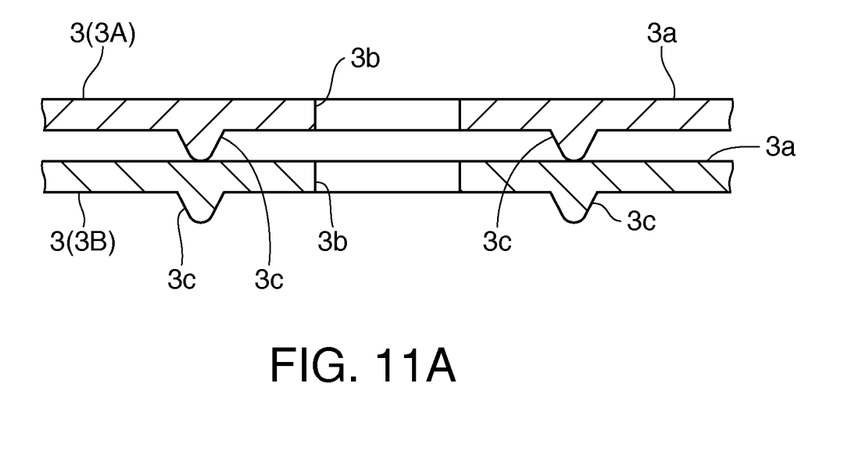
FIGS. 11A-11C describe how media are stacked.
Figure 11B:
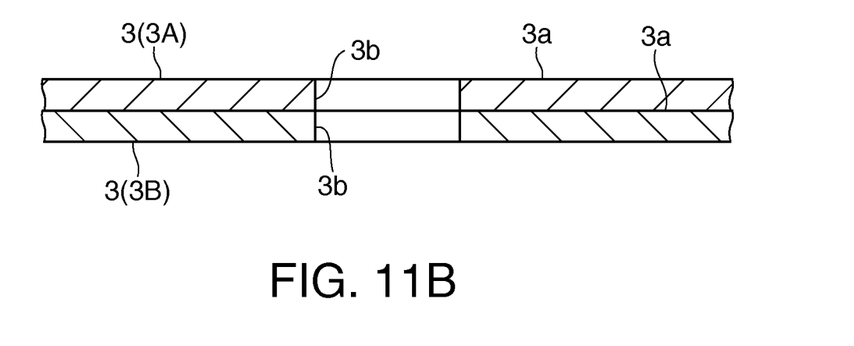
Figure 11C:
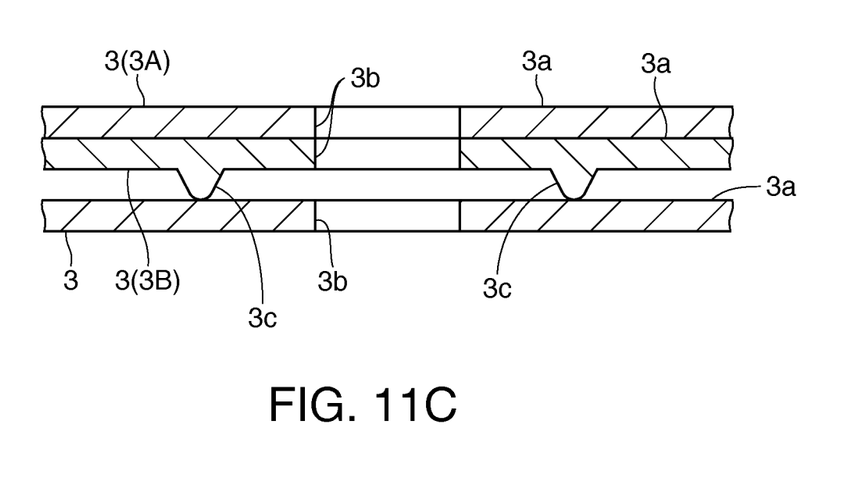

FIG. 11A to FIG. 11C describe how the discs 3 are stacked. As described above, because a separating mechanism 32 is provided on the transportation arm 18, the next disc 3B sticking to the bottom of the top disc 3A that is picked and lifted by the transportation arm 18 can be separated from the top disc 3A and dropped. When the disc 3 is a CD or DVD disc (first media), a stacking ring 3c, which is an annular protrusion that protects the recording surface, is formed around the center hole 3b on the recording surface, which is the opposite side as the label side 3a of the disc 3. However, when the disc 3 is a Blu-ray disc (second media), a stacking ring is not formed on the recording surface of the disc 3 as shown in FIG. 11B, and the recording surface side of the disc 3 is flat. Alternatively, a stacking ring that is lower than the stacking ring 3c on CD/DVD media may be formed on the recording surface side of Blu-ray disc media. As a result, when Blu-ray discs 3 are stacked in the media supply stacker 4, the adhesion between one Blu-ray disc and the Blu-ray disc 3 therebelow increases.

The motor control unit 51 of the media transportation mechanism 8 according to this embodiment of the invention controls the speed of the motor 21, and controls the ascent speed of the transportation arm 18 and the speed that the operator 39b of the kick lever 39 moves, so that the next disc 3B can be separated from the top disc 3A when the next disc 3B sticks to the top disc 3A, and the next disc 3B is lifted with the top disc 3A by the transportation arm 18, even when there is strong adhesion between the discs 3. More specifically, the motor control unit 51 controls the ascent speed of the transportation arm 18 and the speed that the operator 39b of the kick lever 39 moves as described below.

First, even if the top disc 3A is a Blu-ray disc, the next disc 3B sticks to the bottom of the top disc 3A, and the next disc 3B is picked up by the transportation arm 18 with the top disc 3A, air can penetrate between the top disc 3A and the next disc 3B more easily with the passage of time after the top disc 3A and the next disc 3B are picked up together due to the effect of the weight of the next disc 3B, and the adhesion between the top disc 3A and the next disc 3B weakens.

Under specific conditions, this embodiment of the invention therefore reduces the speed of the motor 21, slows the ascent of the transportation arm 18 and the movement of the operator 39b, and increases the time from when the transportation arm 18 starts rising after gripping the top disc 3A until the kick lever 39 starts separating the next disc 3B to reduce adhesion between the top disc 3A and the next disc 3B and more easily separate the next disc 3B from the top disc 3A.

More specifically, the motor 21 can be driven at two speeds, the motor control unit 51 changes the speed of the motor 21 so that the motor 21 operates at a normal speed except during these specific conditions, and the motor 21 operates at a speed slower than the normal speed under these specific conditions, and changes the ascent speed of the transportation arm 18 and the speed of operator 39b movement. More specifically, if the ascent speed of the transportation arm 18 under conditions other than these specific conditions is a first speed, and the speed of operator 39b under conditions other than these specific conditions is a third speed, the motor control unit 51 changes the speed of the motor 21, changes the ascent speed of the transportation arm 18 from the first speed to a second speed that is slower than the first speed, and changes the speed of the operator 39b from the third speed to a fourth speed that is slower than the third speed under these specific conditions.

These specific conditions are, for example, that all discs 3 stored in the media supply stacker 4 are Blu-ray discs, and the number of discs stored in the media supply stacker 4 is two. If all discs stored in the media supply stacker 4 are Blu-ray discs, the number of discs stored in the media supply stacker 4 is three or more, the discs stick together, and the transportation arm 18 picks up the top disc 3A, the weight of the third and other discs below the next disc 3B is felt between the top disc 3A stored in the media supply stacker 4 and the next disc 3B immediately below. As a result, the next disc 3B easily separates from the top disc 3A when the transportation arm 18 picks up the top disc 3A.

However, when the number of discs stored in the media supply stacker 4 is two and the transportation arm 18 picks up the top disc 3A, only the weight of the next disc 3B works between the two discs 3, that is, the top disc 3A and the next disc 3B. As a result, the next disc 3B is easily picked up by the transportation arm 18 with the top disc 3A, and when two discs are picked up by the transportation arm 18, it is more difficult for the next disc 3B to separate from the top disc 3A. Therefore, to make it easier to separate the next disc 3B from the top disc 3A under this condition, the motor control unit 51 changes the speed of the motor 21 and slows the ascent of the transportation arm 18 and movement of the operator 39b.

Whether the number of discs in the media supply stacker 4 is two or not is detected, for example, by the motor control unit 51 (computing unit) based on: (1) the detection result from the detector 46; and (2) the number of steps the motor 21, which can be a stepper motor, is driven. The motor control unit 51 can be implemented using a CPU in the controller. More specifically, whether the number of discs in the media supply stacker 4 is two or not is detected based on the number of steps the motor 21 is driven from a specific reference position when the interrupter 47b of the detection lever 47 moves from between the light-emitting device and photodetection device of the detector 46. When the number of discs 3 in the media supply stacker 4 is determined to be two, the motor control unit 51 automatically changes the speed of the motor 21.

Another example of these specific conditions is when a mixture of CD, DVD, and Blu-ray disc media 3 are stored in the media supply stacker 4, the top disc 3A in the media supply stacker 4 is a Blu-ray disc, and the next disc 3B therebelow is a CD or DVD disc as shown in FIG. 11C.

Even if the number of discs stored in the media supply stacker 4 is three or more, the gap between the next disc 3B that is second from the top and the disc 3 therebetween (the third disc from the top) increases in this case, adhesion between the next disc 3B and the disc 3 therebelow weakens, and these two discs 3 separate easily when the transportation arm 18 picks up the top disc 3A.

However, the adhesion holding the top disc 3A and next disc 3B together increases. As a result, even though there are three or more discs 3 in the media supply stacker 4, the next disc 3B is easily picked up with the top disc 3A by the transportation arm 18 when the transportation arm 18 picks up the top disc 3A, and separating the next disc 3B from the top disc 3A is difficult when the two discs 3 are lifted by the transportation arm 18. To ease separating the next disc 3B from the top disc 3A in this case, the motor control unit 51 therefore changes the speed of the motor 21 and slows the ascent of the transportation arm 18 and movement of the operator 39b.

Note that whether the top disc 3A in the media supply stacker 4 is a Blu-ray disc and the next disc 3B directly therebelow is CD or DVD media can be checked by the operator of the media processing device 1, for example. The motor control unit 51 also changes the speed of the motor 21 based on information input by the operator to a media information input unit. Media information input unit is a functional part of a printer driver executed in a computer connected to the media processing device 1, the functional part of a control panel disposed on the media processing device 1 not shown for example or a select button disposed on the media processing device 1 not shown for example.

As described above, under specific conditions in which separating the next disc 3B from the top disc 3A is difficult, the motor control unit 51 in this embodiment of the invention reduces the speed of the motor 21, slows the ascent of the transportation arm 18 and movement of the operator 39b, and increases the time from when the transportation arm 18 gripping the top disc 3A starts to rise and the kick lever 39 separates the next disc 3B from the top disc 3A. As a result, adhesion between the top disc 3A and next disc 3B when the kick lever 39 separates the discs can be reduced when the next disc 3B is picked up with the top disc 3A by the transportation arm 18.

The next disc 3B sticking to the bottom of the top disc 3A can therefore be dropped before the separating operation of the kick lever 39, and even if the next disc 3B sticking to the bottom of the top disc 3A cannot be dropped before the separating operation of the kick lever 39, the next disc 3B sticking to the bottom of the top disc 3A can be separated from the top disc 3A and dropped by the separating operation of the kick lever 39. As a result, the top disc 3A can be held by the fingers 38 while the next disc 3B is separated from the top disc 3A when the next disc 3B is picked up by the transportation arm 18 with the top disc 3A both when a stacking ring is not formed on the top disc 3A and when the height of the stacking ring formed on the top disc 3A is short and the adhesion between the stacked discs 3 is strong. This embodiment of the invention can therefore reliably transport discs 3 one by one even when adhesion between stacked discs 3 is strong.

Other Embodiments

The specific conditions for changing the speed of the motor 21 in the embodiment described above include when the number of discs 3 stored in the media supply stacker 4 is two, and when the top disc 3A in the media supply stacker 4 is a Blu-ray disc and the next disc 3B therebelow is a CD or DVD medium. Another specific condition for changing the speed of the motor 21 could be when the weight of the discs 3 lifted by the transportation arm 18 is the weight of two or more discs 3. The next disc 3B is lifted with the top disc 3A by the transportation arm 18 in this case, but the speed of transportation arm 18 ascent and the speed of kick lever 39 movement are slowed, and the next disc 3B can be separated from the top disc 3A.

Whether the weight of the discs lifted by the transportation arm 18 is the weight of two or more discs can be detected in this case by the motor control unit 51 (decision unit) based on the motor 21 current, for example. When the weight of the discs 3 lifted by the transportation arm 18 is determined to be the weight of two or more discs, the motor control unit 51 automatically changes the speed of the motor 21.

Further alternatively, the specific condition for changing the speed of the motor 21 could also be when the media processing device 1 is operating at night, or during unmanned operation of the media processing device 1. When the media processing device 1 is operating at night, there is a strong possibility that the operator of the media processing device 1 is not near the media transportation mechanism 8. The operator is also not near the media transportation mechanism 8 during unmanned operation of the media processing device 1. If in these situations the adhesion between the top disc 3A and next disc 3B is strong, the next disc 3B cannot be separated from the top disc 3A, and the next disc 3B drops with the top disc 3A from the transportation arm 18, operation of the media transportation mechanism 8 may simply stop or the media transportation mechanism 8 could be damaged.

However, if nighttime operation or unmanned operation of the media processing device 1 are included in the specific conditions, and the speed of the motor 21 is changed under these conditions, the next disc 3B can be separated from the top disc 3A even if the adhesion between the top disc 3A and the next disc 3B is strong and the next disc 3B is lifted by the transportation arm 18 with the top disc 3A. As a result, the foregoing problems can be solved. Note that during nighttime operation or unmanned operation of the media processing device 1, the motor control unit 51 changes the speed of the motor 21 based on operator input to a mode setting unit. The mode setting unit is a computer connected to the media processing device 1 or the control panel disposed on the media processing device 1 not shown for example.

When the motor 21 operates in the embodiment described above, the transportation arm 18 moves vertically and the operator 39b moves, but separate drive sources could be used to raise the transportation arm 18 and move the operator 39b. In this case, the speed of operator 39b movement could be slowed without changing the speed of transportation arm 18 ascent under the specific conditions. Further alternatively, if the kick lever 39 moves to separate the media when the transportation arm 18 rises to a specific height, the ascent of the transportation arm 18 could be slowed without changing the speed of the operator 39b under the specific conditions. Further alternatively, the ascent of the transportation arm 18 could be slowed and the movement of the operator 39b could be slowed under the specific conditions. The time from when the transportation arm 18 holding the top disc 3A starts to rise until the kick lever 39 operates to separate the next disc 3B can be increased in each of these cases.

The invention being thus described, it will be apparent that it may be varied in many ways. Such variations are not to be regarded as a departure from the spirit and scope of the invention, and all such modifications as would be known to one skilled in the art are intended to be included within the scope of the following claims.

What is claimed is:

1. A media transportation mechanism comprising:
    a storage unit that stores disc-shaped media with a hole;
    a transportation arm that moves vertically and has
        a gripping member to hold a medium stored in the storage unit, and
        a separating member that moves radially relative to the medium from the hole of the medium; and
    a transportation arm drive member that sets an ascent speed of the transportation arm to a first speed, and to a second speed that is slower than the first speed, when moving the transportation arm vertically up with the gripping member holding the medium.

2. The media transportation mechanism described in claim 1, further comprising:
    a separating member drive member that sets a movement speed of the separating member to a third speed, and to a fourth speed that is slower than the third speed, when moving the separating member radially relative to the medium.

3. The media transportation mechanism described in claim 2, wherein:
    the transportation arm drive member and the separating member drive member cooperate; and
    when the transportation arm drive member moves the transportation arm at the first speed, the separating member drive member moves the separating member at the third speed.

4. The media transportation mechanism described in claim 2, further comprising:
    a controller that changes the ascent speed when the transportation arm drive member moves the transportation arm.

5. The media transportation mechanism described in claim 4, further comprising:
    a media detection unit that detects the number of media stored in the storage unit;
    wherein the controller changes the ascent speed of the transportation arm from the first speed to the second speed when the number of media detected by the media detection unit is two.

6. The media transportation mechanism described in claim 5, wherein:
    the transportation arm drive member has a stepper motor that produces drive power to move the transportation arm;
    the media detection unit has a media detector that is disposed on the transportation arm and detects the medium when the transportation arm moves to within a specific distance of the medium stored in the storage unit, and a computing unit that calculates the number of media stored in the storage unit based on the number of steps the stepper motor has driven when the transportation arm moves to a position where the media detection unit detects the medium; and
    the media detection unit detects whether the number of media stored in the storage unit is two based on a result from the computing unit.

7. The media transportation mechanism described in claim 4, further comprising:
    a transported number detection unit that comprises a load detector that detects the load on the transportation arm drive member when raising the transportation arm with the gripping member of the transportation arm holding the medium, and a decision member that determines the number of media held by the gripping member based on an output of the load detector,
    wherein the decision member determines the number of media held by the gripping member is two or more when the load detected by the load detector is greater than a predetermined load.

8. The media transportation mechanism described in claim 7, wherein:
    the transportation arm drive member has a motor that produces drive power that moves the transportation arm;
    the load detector measures current driving the motor; and
    the decision member determines the number of media held by the gripping member based on the current.

9. The media transportation mechanism described in claim 4, wherein:
    the media stored in the storage unit includes
        a first medium that has a printing side that is printed on and a recording side on which data is recorded and which has a stacking ring of a first height, and
        a second medium that has a printing side that is printed on and a recording side on which data is recorded and which has either a stacking ring that is lower than the first height or no stacking ring.

10. The media transportation mechanism described in claim 9, further comprising:
    a media information input unit to which information about the media stored in the storage unit is input,
    wherein the media information input to the media information input unit includes information indicating that the second medium is stacked on the first medium; and
    the controller sets the ascent speed for raising the transportation arm to the second speed when transporting the second media with the gripping member of the transportation arm.

11. The media transportation mechanism described in claim 4, further comprising:
    an input unit that sets an operating mode for operating the media transportation mechanism;
    wherein the controller sets the ascent speed of the transportation arm to the first speed when a first mode is set by the input unit, and
    the controller sets the ascent speed of the transportation arm to the second speed when a second mode is set by the input unit.

12. A method of controlling a media transportation mechanism, comprising:
    lowering a transportation arm with a gripping member in a storage unit that stores disc-shaped media with a hole;
    detecting a number of media stored in the storage unit;
    moving the transportation arm vertically up at a first speed after holding a medium with the gripping member of the transportation arm when the detected number of media stored in the storage unit is three or more; and moving the transportation arm vertically up at a second speed that is slower than the first speed after holding the medium with the gripping member of the transportation arm when the detected number of media stored in the storage unit is two.

13. The method of controlling a media transportation mechanism described in claim 12, further comprising:

moving a separating member disposed on the transportation arm radially relative to the medium at a third speed after moving the transportation arm at the first speed when the detected number of media stored in the storage unit is three or more; and moving the separating member at a fourth speed that is slower than the third speed after moving the transportation arm at the second speed when the detected number of media stored in the storage unit is two.

14. A media processing device comprising:

a storage unit that stores disc-shaped media with a hole;

a transportation arm that moves vertically, pivots on an axis, and comprises a gripping member to hold a medium stored in the storage unit, and a separating member that moves radially to the medium from the hole of the medium;

a transportation arm drive member that sets an ascent speed of the transportation arm to a first speed, and to a second speed that is slower than the first speed, when moving the transportation arm vertically up with the gripping member holding the medium; and a recording unit that records data on the media transported by the transportation arm.

15. The media processing device described in claim 14, further comprising:

a separating member drive member that sets a movement speed of the separating member to a third speed, and to a fourth speed that is slower than the third speed, when moving the separating member radially relative to the medium.

16. The media processing device described in claim 15, wherein:

the transportation arm drive member and the separating member drive member cooperate; and when the transportation arm drive member moves the transportation arm at the first speed, the separating member drive member moves the separating member at the third speed.

17. The media processing device described in claim 14, further comprising:

a controller that changes the ascent speed when the transportation arm drive member moves the transportation arm.

18. The media processing device described in claim 17, further comprising:

a media detection unit that detects the number of media stored in the storage unit;

wherein the controller changes the ascent speed of the transportation arm from the first speed to the second speed when the number of media detected by the media detection unit is two.

19. The media processing device described in claim 18, wherein:

the transportation arm drive member comprises a stepper motor that produces drive power to move the transportation arm;

the media detection unit has a media detector that is disposed on the transportation arm and detects the medium when the transportation arm moves to within a specific distance of the medium stored in the storage unit, and a computing unit that calculates the number of media stored in the storage unit based on the number of steps the stepper motor has driven when the transportation arm moves to where the media detection unit detects the medium; and the media detection unit detects whether the number of media stored in the storage unit is two based on a result from the computing unit.

* * * * *